(12) United States Patent
Paulus

(10) Patent No.: US 10,240,334 B2
(45) Date of Patent: Mar. 26, 2019

(54) Z-ARCH BUILDING SYSTEM

(71) Applicant: Antoine Marcel Paulus, Surrey (CA)

(72) Inventor: Antoine Marcel Paulus, Surrey (CA)

( * ) Notice: Subject to any disclaimer, the term of this patent is extended or adjusted under 35 U.S.C. 154(b) by 0 days.

(21) Appl. No.: 15/556,273

(22) PCT Filed: Mar. 10, 2016

(86) PCT No.: PCT/CA2016/050264
§ 371 (c)(1),
(2) Date: Sep. 6, 2017

(87) PCT Pub. No.: WO2016/141488
PCT Pub. Date: Sep. 15, 2016

(65) Prior Publication Data
US 2018/0051455 A1    Feb. 22, 2018

Related U.S. Application Data

(60) Provisional application No. 62/131,192, filed on Mar. 10, 2015.

(51) Int. Cl.
| | |
|---|---|
| *E04B 1/14* | (2006.01) |
| *E04B 1/08* | (2006.01) |
| *E04B 1/12* | (2006.01) |
| *E04B 1/61* | (2006.01) |
| *E04B 1/32* | (2006.01) |
| *E04B 1/35* | (2006.01) |
| *E04C 2/00* | (2006.01) |

(52) U.S. Cl.
CPC ............... *E04B 1/14* (2013.01); *E04B 1/08* (2013.01); *E04B 1/12* (2013.01); *E04B 1/6179* (2013.01); *E04B 1/3205* (2013.01); *E04B 1/6137* (2013.01); *E04B 2001/3583* (2013.01); *E04C 2002/004* (2013.01)

(58) Field of Classification Search
CPC .. E04B 1/14; E04B 2001/3583; E04B 1/6179; E04B 1/6137
See application file for complete search history.

(56) References Cited

U.S. PATENT DOCUMENTS

| | | | | |
|---|---|---|---|---|
| 2,142,305 | A | * 1/1939 | Davis | ............. E04B 1/6125 |
| | | | | 446/108 |
| 3,452,498 | A | * 7/1969 | Kinsey | ............. E04B 1/0007 |
| | | | | 52/262 |
| 3,455,070 | A | 7/1969 | Wiklund | |
| 4,283,898 | A | 8/1981 | Claver | |
| 4,941,304 | A | * 7/1990 | Lewellin | ............. E04B 1/90 |
| | | | | 52/580 |
| 5,117,602 | A | * 6/1992 | Marschak | ............. E04B 9/0478 |
| | | | | 52/376 |

(Continued)

*Primary Examiner* — Babajide A Demuren
(74) *Attorney, Agent, or Firm* — Martin IP Pty Ltd

(57) ABSTRACT

A building system comprises one or more panels with one or more "Z-shaped" edges. The panels may connected to each other through interaction of the corresponding shaped edges. In addition, a building component comprises upper and lower surfaces and first and second lateral ends. One or more of the building components may be connected together through engagement of the second lateral end of a first building component with the first lateral end of a second building component. Through this connection, vertical forces on the building components are transferred laterally.

23 Claims, 11 Drawing Sheets

(56) References Cited

U.S. PATENT DOCUMENTS

| | | | | |
|---|---|---|---|---|
| 5,799,462 A | * | 9/1998 | McKinney | B29C 33/40 |
| | | | | 29/897.32 |
| 6,295,778 B1 | * | 10/2001 | Burt | E04B 1/12 |
| | | | | 52/233 |
| 6,502,357 B1 | * | 1/2003 | Stuthman | E04B 2/7448 |
| | | | | 52/239 |
| 7,162,847 B2 | * | 1/2007 | Gigiakos | E04B 2/7453 |
| | | | | 52/582.1 |
| 7,356,970 B1 | | 4/2008 | Frobosilo | |
| 7,784,227 B2 | * | 8/2010 | Ribeiro | E04H 4/0043 |
| | | | | 4/506 |
| 8,146,314 B2 | * | 4/2012 | Nguyen | E04B 1/08 |
| | | | | 52/241 |
| 2002/0069600 A1 | * | 6/2002 | Bryant | E04B 1/12 |
| | | | | 52/309.9 |
| 2004/0060245 A1 | * | 4/2004 | Loblick | E04B 1/12 |
| | | | | 52/79.5 |
| 2004/0139680 A1 | * | 7/2004 | Hambright | E04B 2/06 |
| | | | | 52/578 |
| 2005/0076611 A1 | | 4/2005 | Crawford | |
| 2008/0196355 A1 | * | 8/2008 | Williams | E04B 1/14 |
| | | | | 52/794.1 |
| 2009/0049778 A1 | * | 2/2009 | Kralic | E04B 1/04 |
| | | | | 52/309.17 |
| 2013/0042556 A1 | | 2/2013 | Armijo | |
| 2014/0140766 A1 | | 5/2014 | Riccobene et al. | |

* cited by examiner

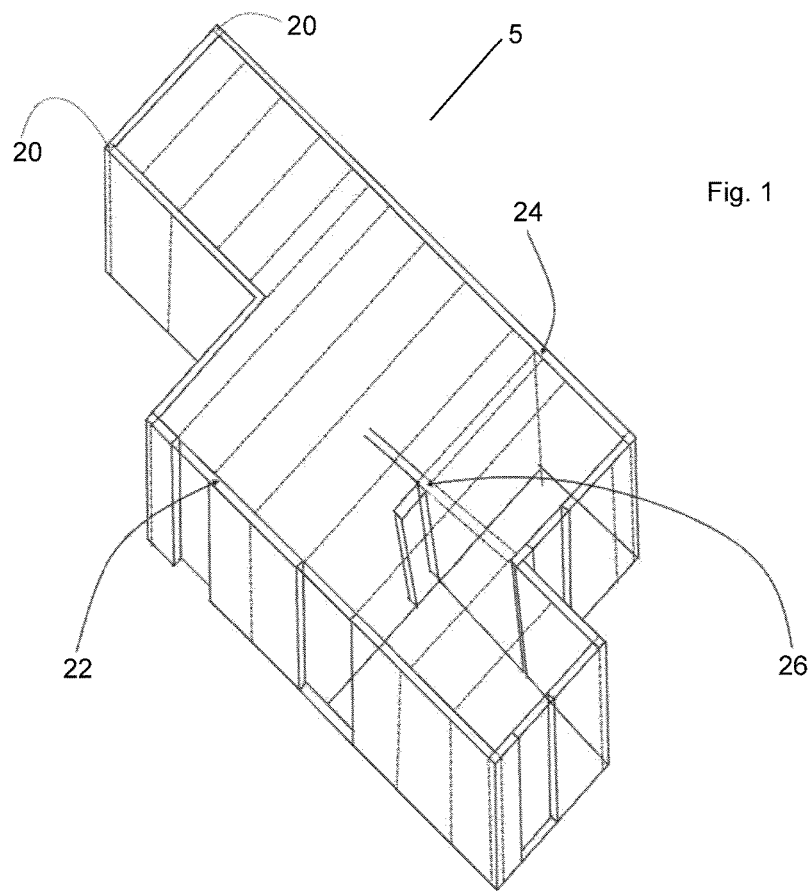
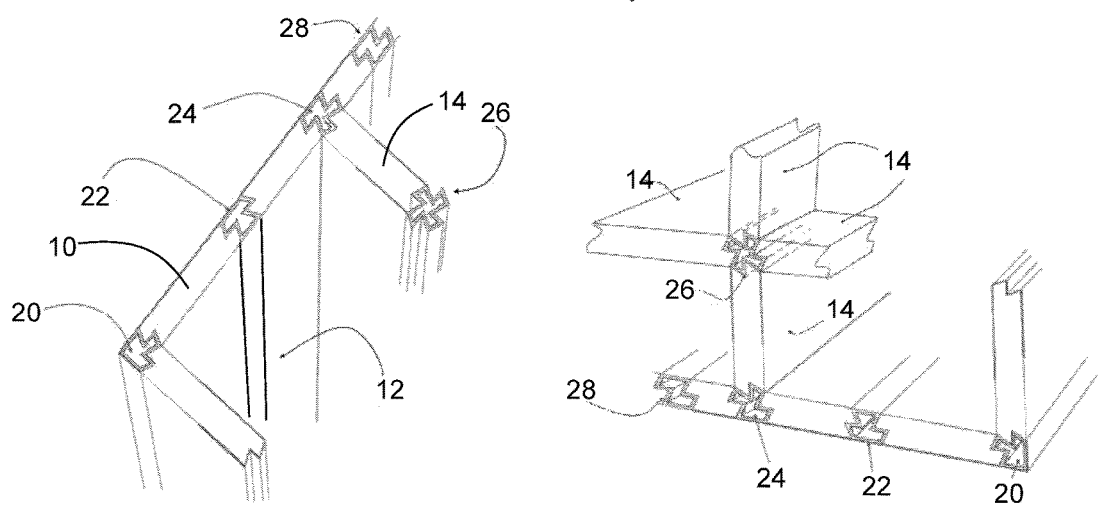
Fig. 1
Fig. 2
Fig. 3

Fig. 12
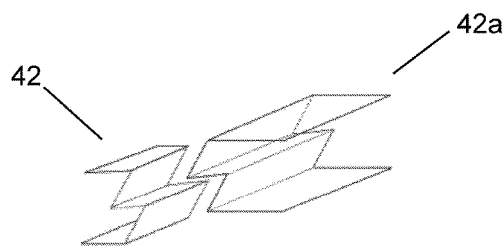
Fig. 13
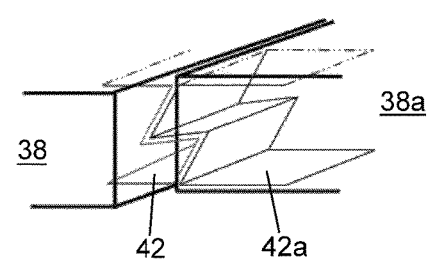
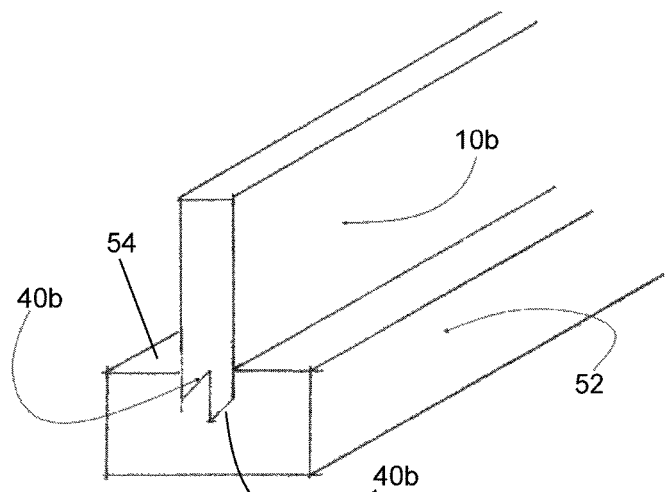
Fig. 14
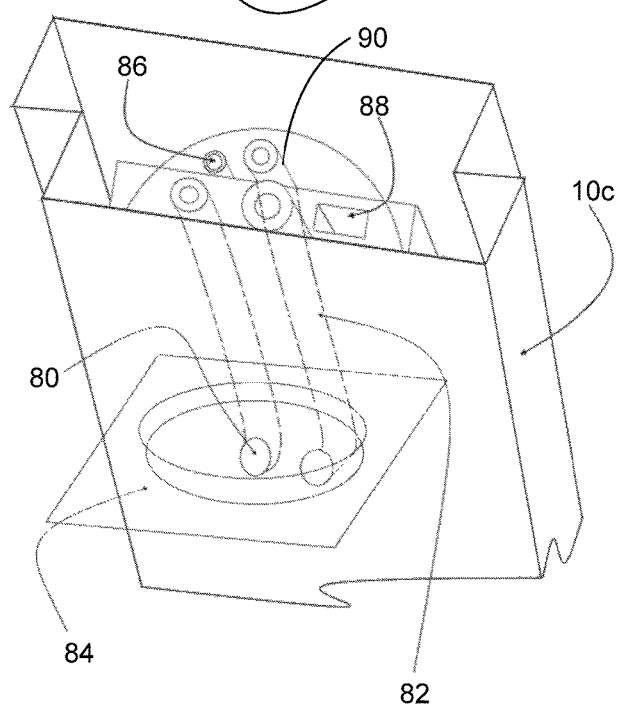
Fig. 15

Z-ARCH BUILDING SYSTEM

FIELD OF THE INVENTION

The present invention relates to building systems, and in particular, Z-arch pre-manufactured modular building systems that are transportable and demountable and may be used in the construction of buildings, canals, reservoirs, and other such structures.

BACKGROUND OF THE INVENTION

Demountable temporary buildings are known in the art and are often used to provide temporary shelter during natural disasters. Historically, these took the form of tents; however, more recently, there has been a move towards easily transportable, demountable building systems that can be quickly dispatched to a desired location and erected, and which are sturdier than a simple tent-like structure.

For example, U.S. Pat. No. 2,820,990 teaches a demountable building formed of a precut material that can be collapsed for packaging for shipment and later erected with a minimum of skill.

Another such system is taught in U.S. Pat. No. 3,277,620, which discloses a demountable building formed from a number of prefabricated parts designed to be packaged and shipped as a unit for assembly at a building site.

Yet another system is taught in PCT Application No. PCT/AU2010/000549 (International Publication No. WO 2010/129995). The demountable building in this system is reconfigurable between a collapsed transport configuration and an erect configuration.

Building systems using steel panels are also known. For example, U.S. Pat. No. 8,146,314 teaches a prefabricated universal structural steel panel system comprising a generally elongated rectangular panel that has male and female connecting members for connecting adjoining panels. The panels can be used to form the walls, floor, ceiling, and roof of a building. While the panels can be connected using the male and female connecting members, they may be further secured to one another using fasteners, spot welding, or adhesive bonding.

Accordingly, there is still need for a more simplified yet more diverse and elaborate prefabricated building system. Other objects of the invention will be apparent from the detailed description below.

BRIEF SUMMARY OF THE INVENTION

The invention comprises a pre-manufactured modular building system using a unique Z-arch connection system to allow interconnection of adjacent building structures and also introduces the Z-arching floor and wall building system among other advantages.

In one aspect of the invention, a building system comprises one or more panels, with each of the panels comprising an outer frame with at least one shaped edge. The shaped edge comprises first and second wall segments spanned by a ledge. The system also comprises one or more connectors, with each of the connectors comprising at least one of the shaped edges. One of the panels is connected to either another one of the panels or one of the connectors through interaction of corresponding shaped edges.

In another aspect, the building system comprises two or more panels. Each of the panels comprises an outer frame with at least one shaped edge, the shaped edge comprising first and second wall segments spanned by a ledge. One of the panels is connected to another one of the panels through interaction of corresponding shaped edges.

The outer frame of the building system may comprise longitudinal sides, and the first and second wall segments are angled with respect to the longitudinal sides. The first and second wall segments may be substantially parallel to each other.

The ledge may be substantially parallel to the longitudinal sides, or the ledge may be angled with respect to the longitudinal sides.

In another aspect of the invention, a system for connecting two panels comprises first and second connectors. Each of the first and second connectors comprises flanges for engaging one of the panels and a shaped edge extending between the flanges. The shaped edge comprises first and second wall segments spanned by a ledge. The shaped edge of the first connector interacts with the shaped edge of the second connector to connect the two panels together.

The first and second connectors are formed by bending a sheet of material, such as steel.

The flanges may be adapted to slide over one or more sides of the panel. The flanges may also be adapted to be inserted into one end of the panel. Also, the ledge may be adapted to be inserted into one end of the panel. Still yet, the flanges may be adapted to be connected to one end of the panel using one or more fasteners.

In a further aspect of the invention, a building component comprises upper and lower surfaces and first and second lateral ends. The first lateral end comprises a first upper descending surface extending from the upper surface, a first lower descending surface extending from the lower surface, and a first middle surface spanning the first upper descending surface and the first lower descending surface. The second lateral end comprises a second upper descending surface extending from the upper surface, a second lower descending surface extending from the lower surface, and a second middle surface spanning the second upper descending surface and the second lower descending surface. An interior of the building component is substantially hollow.

The first upper descending surface may be substantially parallel to the first lower descending surface. The second upper descending surface may be substantially parallel to the second lower descending surface. The first middle surface may be substantially parallel to the second middle surface. The first and second middle surfaces may be angled at an angle greater than 0 and up to approximately 5 degrees to the horizontal.

The upper surface and the lower surface may be either flat or curved.

The building component may be made of metal or composites of plastic and may be formed from one piece of material, or more.

In a further aspect, a building system comprises two or more building components. The second upper descending surface, the second middle surface, and the second lower descending surface of a first building component are adapted to engage with the first upper descending surface, the first middle surface, and the first lower descending surface, respectively, of a second building component.

The foregoing was intended as a summary only and of only some of the aspects of the invention. It was not intended to define the limits or requirements of the invention. Other aspects of the invention will be appreciated by reference to the detailed description of the preferred embodiments.

Moreover, this summary should be read as though the claims were incorporated herein for completeness.

BRIEF DESCRIPTION OF THE DRAWINGS

These and other features of the invention will become more apparent from the following description in which reference is made to the appended drawings and wherein:

FIG. 1 is a perspective view of a building built using the modular building system of the invention;

FIG. 2 is a top perspective sectional view of a portion of the building shown in FIG. 1;

FIG. 3 is a front perspective sectional view of a portion of the building shown in FIG. 1;

FIG. 12 is a perspective view of two Z-arch connectors disengaged;

FIG. 13 is a perspective view of two Z-arch connectors engaged;

FIG. 14 shows a wall connected to a base in accordance with an embodiment of the invention;

FIG. 15 shows a panel pre-equipped with MEP and HVA, in accordance with an embodiment of the invention;

DETAILED DESCRIPTION

Figure 4:
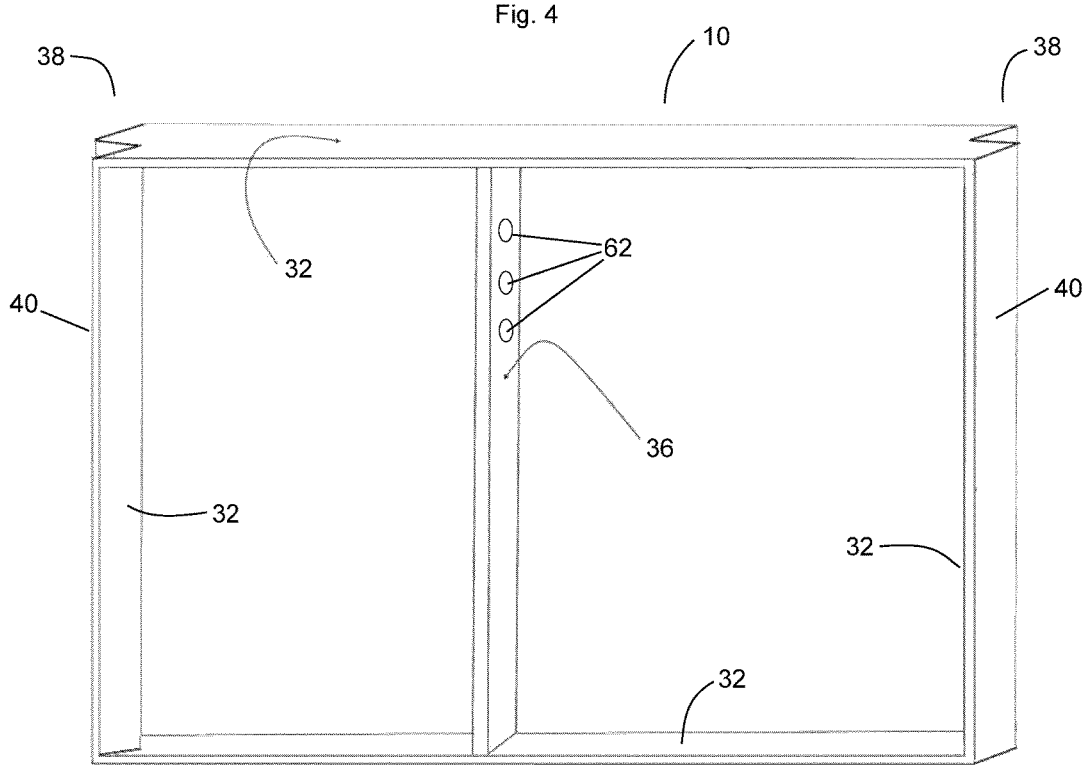
FIG. 4 is a front perspective view of a panel according to an embodiment of the invention.

The invention comprises a demountable building system which is illustrated in the figures and described in more detail below. One of the elements of the invention is the Z-arch (which may also be generally referred to the "Z-arch connection" or "Z-arching"). It is worthy to note that the curve of the traditional building arch was slightly flattened with the development of the Jack arching system. In one aspect of the invention, the curve of the conventional arch has been flattened further to form the Z-arch. Moreover, the conventional arch and the Jack arch can only be used to support weights and items in a vertical axis but the Z-arch supports forces laterally and horizontally, as well as vertically.

Thus, the Z-arch can connect the walls or the sides of building or other modules from the sides as well as from the top and bottom. The Z-arch also has a "positive" and "negative" side and this is of particular importance in building the walls of canals or reservoirs. The positive side may be employed to hold the wall and contain the weight of the water and countering the force of the current.

In one aspect, the building system according to the invention comprises a plurality of pre-manufactured panels that can be interconnected to form walls, floors, and ceilings of a building (as well as canals and reservoirs and such similar structures). FIG. 1 depicts an example of a building 5 formed using the building system of the invention.

Reference is made to FIGS. 2 and 3, which shows portions of the interconnection between panels 10, 12, 14 and various connectors 20, 22, 24, 26, 28 in building 5. Referring to FIG. 2, panel 10 is mounted between a corner connector 20 and a middle connector 22. Panel 12 is mounted between the middle connector 22 and a three-way connector 24, and panel 14 is mounted between the three-way connector 24 and a four-way connector 26.

Turning to FIG. 3, the four-way connector 26 may be connected with four panels 14. In addition, FIGS. 2 and 3 also show an alternative middle connector 28 with a different geometry from that of the middle connector 22. Each of the panels 10, 12, 14 and the connectors 20, 22, 24, 26, 28 comprise one or more shaped edges 40 as described in further detail below. The various panels 10, 12, 14 are coordinated with their respective connectors 20, 22, 24, 26, 28 through these shaped edges 40 to provide a tight fit. It is also contemplated that adjacent panels 10, 12, 14 equipped with these shaped edges 40 can be connected directly to one another without the use of the connectors 20, 22, 24, 26, 28, depending on the needs of a given project.

Referring to FIG. 4, exemplary panel 10 preferably comprises outer framing elements 32 that generally form the perimeter of the panel 10. Within the outer framing elements 32 may be one or more reinforcing elements 36 (such as braces, brackets, etc.) that may be added as necessary to ensure that the panel 10 meets all local building regulations.

Figure 5:
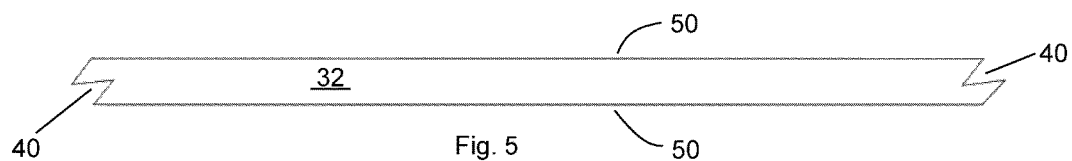
FIG. 5 is a top view of the panel of FIG. 4.

Outer framing elements 32 are preferably made of metal (e.g. light gauge steel) or/and composite plastics and comprise elongated elements that are interconnected using conventional means to form a frame. The outer framing elements 32 are formed such that one or both ends 38 of the panel 10 comprise the shaped edges 40 (that may be "Z" shaped, also referred to as the "Z-key" and/or Z-arch), as best shown from the top view of the panel 10 in FIG. 5.

Figure 6:
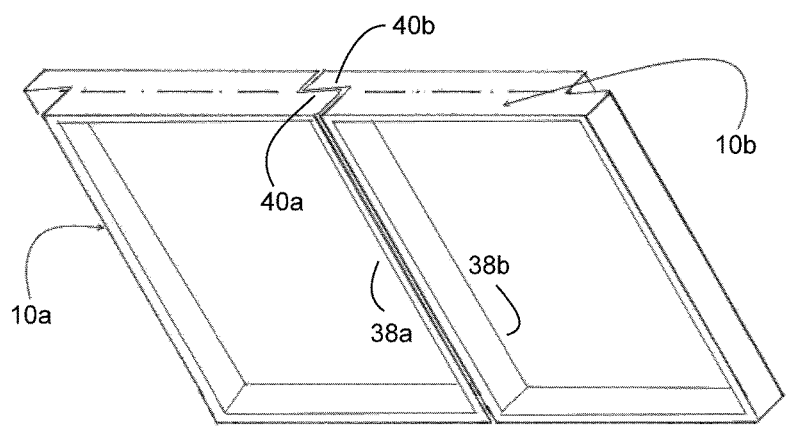
FIG. 6 is a perspective view showing adjacent panels connected together.

Referring to FIG. 6, two exemplary adjacent panels 10a, 10b may be connected together in accordance with the invention without the need for connectors 20, 22, 24, 26, 28. The panels 10a, 10b are placed together in order to allow the Z-keys 40a, 40b on the adjacent ends 38a, 38b to be fitted to one another.

Figure 7A:
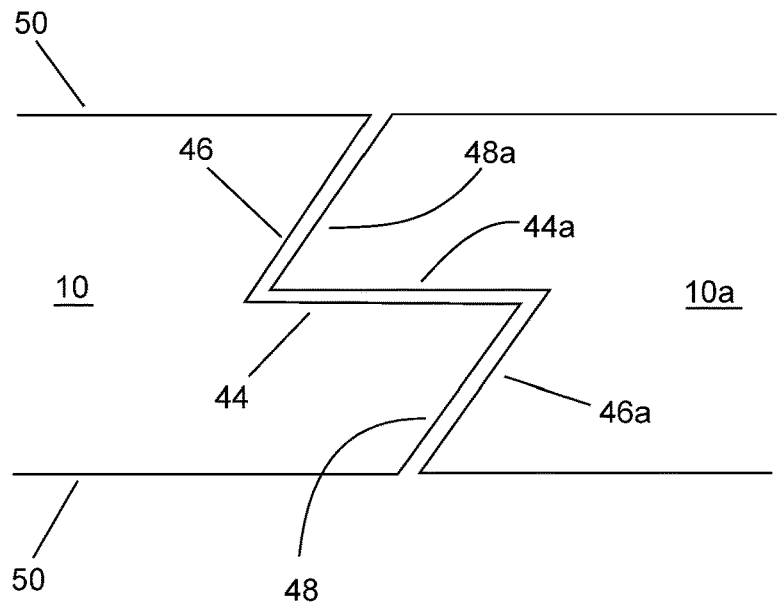
FIG. 7a is a top view showing the interconnection of one embodiment of adjacent panels according to the invention.
Figure 7B:
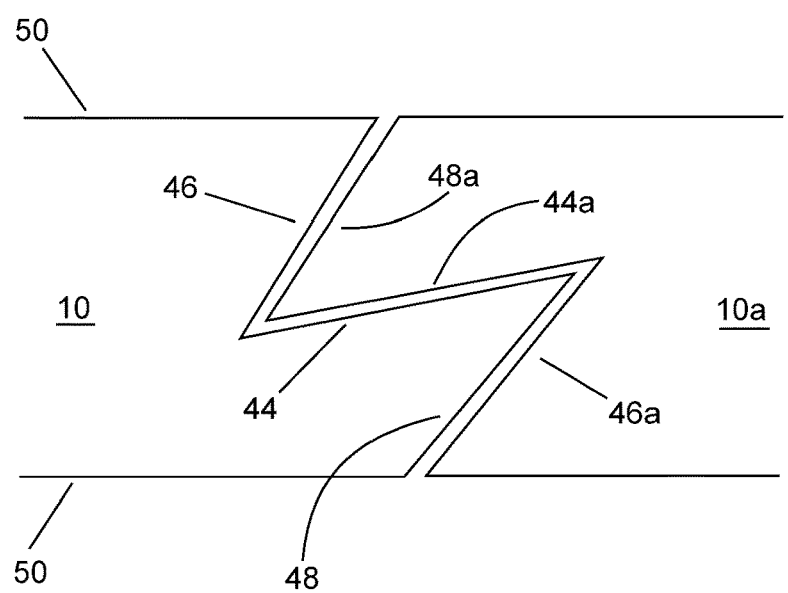
FIG. 7b is a top view showing the interconnection of another embodiment of adjacent panels according to the invention.

FIGS. 7a and 7b show the Z-key 40 in greater detail. Z-key 40 comprises a ledge 44 between first and second wall segments 46, 48. The first and second wall segments 46, 48 are preferably angled with respect to longitudinal sides 50 of the panels 10, 10a (such that they are not perpendicular to sides 50), but are preferably parallel to each other. FIGS. 7a and 7b show two possible orientations for the ledges 44.

In FIG. 7a, the ledge 44 is substantially parallel to the sides 50 of the panel 10. In this embodiment, the panel 10 may be attached to adjacent panel 10a end-to-end such that the ledge 44 of panel 10 slides across the ledge 44a of panel 10a. The first wall segment 46 of panel 10 will then abut with the second wall segment 48a of panel 10a. Similarly, the second wall segment 48 of panel 10 will abut with the first wall segment 46a of panel 10a. This may also be referred to as a "flat connection". The panels 10, 10a can then be locked in place, if desired, using mechanical fasteners, such as bolts or rivets.

In FIG. 7b, the ledge 44 is angled with respect to the sides 50 of the panel 10 (i.e. the ledge 44 is not substantially parallel to the sides 50). Preferably, this angle is greater than 0 and less than 5 degrees with respect to the sides 50; however, it may be greater than 5 degrees, depending on the application. In this embodiment, adjacent ends 38, 38a of the panels 10, 10a need to be initially twisted in order to have the ledge 44 of panel 10 engage with the ledge 44a of panel 10a. However, once engaged, the panels 10, 10a will be held together because of the angled surfaces of the ledges 44, 44a. This may also be referred to as an "angled connection" or a Z-arch connection.

Figure 8:
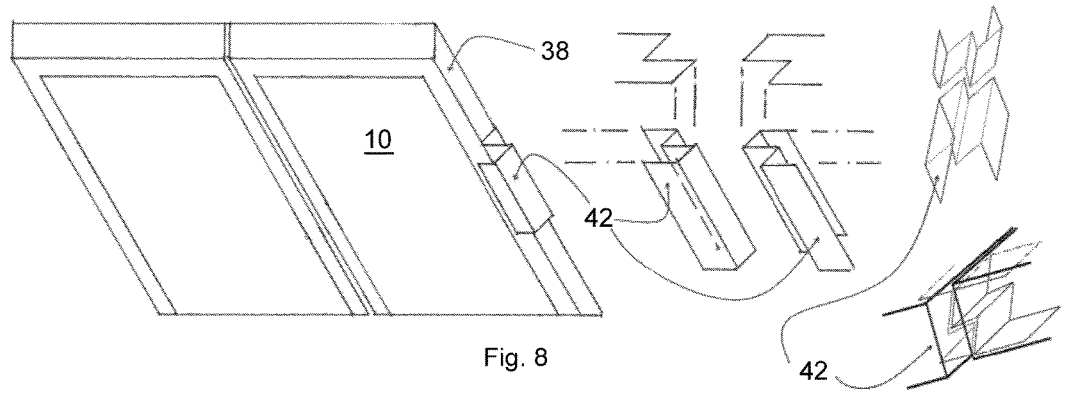
FIG. 8 is a perspective view showing an alternative embodiment of the invention using Z-arch connectors.
Figure 9:
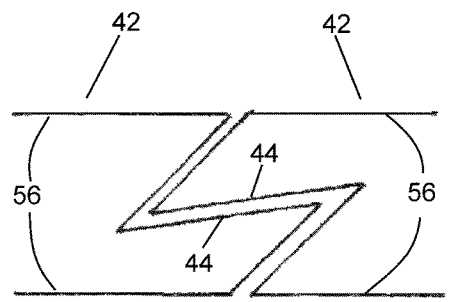
FIG. 9 is a top view showing the interconnection of the Z-arch connectors of FIG. 8 in accordance with one embodiment.
Figure 10:
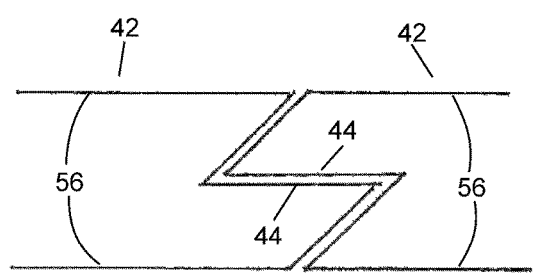
FIG. 10 is a top view showing the interconnection of the Z-arch connectors of FIG. 8 in accordance with another embodiment.

In another embodiment of the invention, one or both of the ends 38 of the panel 10 are substantially flat, with brackets 42 attached to the ends 38, as shown in FIG. 8 and detailed in FIGS. 9 and 10. The brackets 42 are shaped to form the Z-key 40. Therefore, instead of the outer framing elements 32 forming the Z-key 40, the brackets 42 may be attached to the ends 38 to provide the Z-key 40 to the panel 10. The brackets 42 may be attached to the ends 38 using conventional fasteners. Alternatively, the ends 38 may comprise one or more slots 39 (shown in FIG. 11c) for accepting the brackets 42. This embodiment may also be referred to as the "universal Z-arch system", as it allows conventional panels to be modified by attaching the brackets 42.

Where the universal Z-arch system is used, the adjacent ends 38, 38a of panels 10, 10a will have corresponding brackets 42, 42a. The brackets 42, 42a may be first fitted into each other (as described above) and then the brackets 42, 42a themselves may be attached to the ends 38, 38a using appropriate fasteners (e.g. screws, rivets, etc.) or using slots 39, 39a.

FIG. 9 shows one embodiment for the brackets 42 for the universal Z-arch system described above. The brackets 42 may be formed by bending a sheet of material (such as metal) to form the shape of the Z-key 40. One or more flanges 56 may extend from the ends of the Z-key 40. In the embodiment shown in FIG. 9, the ledges 44 of brackets 42 are angled (i.e. they are not parallel to the flanges 56).

FIG. 10 shows another embodiment for the brackets 42 in which the ledges 44 are substantially parallel to the flanges 56.

FIGS. 11a to 11d show possible ways of using the brackets 42 in association with the panels 10. The brackets 42 may be connected to the ends 38 and may extend for a portion of or for the entirety of the ends 38. For example, FIG. 8 shows bracket 42 extending along a middle portion of the end 38. Alternatively, a number of brackets 42 may be connected to the same end 38, with each of the brackets 42 extending for a different portion of the end 38.

Figure 11A:
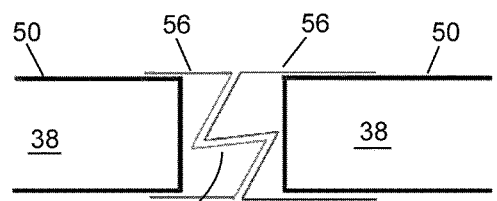
FIG. 11a is a top view showing one type of connection between panels using the Z-arch connectors of FIG. 8.

FIG. 11a shows one embodiment of the bracket 42 wherein the flanges 56 are substantially parallel to the sides 50 and are able to slide over the sides 50. Furthermore, the ledge 44 of the bracket 42 is positioned beyond the end 38 of the panel 10. When adjacent panels 10 with this embodiment are connected together, there is a resulting gap between the adjacent ends 38.

Figure 11B:
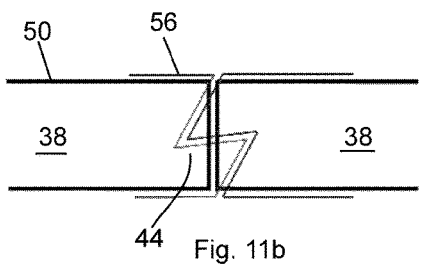
FIG. 11b is a top view showing an alternative connection between panels using the Z-arch connectors of FIG. 8.

FIG. 11b shows another embodiment of the bracket 42. This embodiment is similar to that shown in FIG. 11a, except that in this embodiment, at least a portion of the ledge 44 is within the end 38 of the panel 10. This would require that at least a portion of the end 38 would need to be removed in order to accommodate the insertion of the ledge 44. However, this embodiment would allow for the adjacent ends 38 of the panels 10 to abut each other when connected together.

Figure 11C:
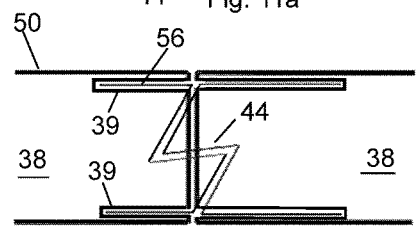
FIG. 11c is a top view showing an alternative connection between panels using the Z-arch connectors of FIG. 8.

FIG. 11c shows yet another embodiment of the bracket 42. This embodiment is similar to that shown in FIG. 11b, except that in this embodiment, the flanges 56 are inserted into the end 38 of the panel 10. This may be done by inserting the flanges 56 inside into the end 38 or by cutting slots 39 into the end 38 to allow for the insertion of the flanges 56. As with the embodiment shown in FIG. 11b, a portion of the end 38 would need to be removed in order to accommodate the insertion of the ledge 44. This embodiment also allows for the adjacent ends 38 of the panels 10 to abut each other when connected together.

Figure 11D:
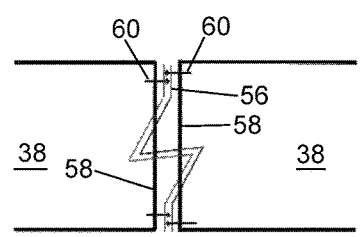
FIG. 11d is a top view showing an alternative connection between panels using the Z-arch connectors of FIG. 8.

FIG. 11d shows another embodiment of the bracket 42. In this embodiment, the flanges 56 extend substantially parallel to the surface 58 of the end 38. The bracket 42 can then be attached to the end 38 through the use of one or more fasteners 60 (e.g. screws, rivets, nails, etc.). A portion of the ledge 44 may be within the end 38.

FIG. 12 shows two brackets 42, 42a disengaged. FIG. 13 shows the interconnection of the two brackets 42, 42a (and attached to ends 38, 38a).

Referring to FIG. 14, using an appropriate lifting system (such as a crane), panel 10b (with Z-key 40b) may be lifted into place above a base unit 52. The base unit 52 comprises a face 54 with a corresponding Z-key 40b provided on the face 54. Workers can then align the Z-key 40b of the panel 10b with the Z-key 40b of the base unit 52. In this example, the Z-keys 40b preferably will use the flat connection described above in order to avoid having to twist the panel 10b and the base unit 52 to ensure a proper fit.

It is understood that the size of the building modules (e.g. the panels 10) can be adjusted to suit any given design and the required specifications and site conditions. The thickness of the steel used to form the outer framing elements 32 can be varied as can the overall dimensions of the panels 10.

The interlocking nature of the Z-keys 40 allows a structure built using the system to be dismantled, demounted, and transported to other locations when and if needed.

The panels 10 may be used for various structural elements, such as walls, floors, and ceilings. Furthermore, it is contemplated that such structural elements may be equipped with various services such as MEP (mechanical, electrical, and plumbing) and HVAC (heating, ventilation and air conditioning). Preferably, such services may be combined together in an embodiment of the panel 10, such as in MEP-HVAC module 10c as is shown in FIG. 15. One or more of a hot water supply pipe 80, a cold water supply pipe 82, an electrical conduit 86, and a heating vent 88 may be pre-installed in the module 10c. A sink 84 can then either be quickly connected to the pipes 80, 82 or pre-installed. A drain 90 may also be incorporated into the module 10c.

The panels 10 can also be delivered to the building site with complete or semi-complete wall and ceiling finishes. The inner and outer skins of these panels or modules can be finished with gypsum board and/or fiber/cement board or any other type of material or product as appropriate. This may include photovoltaic (PV) panels may also serve as shuttering. Once the inner and outer skins are in place, a filler material, generally of lightweight insulation, may be poured into a void within the panel. Preferably, the reinforcing elements 36 have a plurality of openings 62 defined therein to allow the filler material to pass through and fill the entire void. Alternatively, the openings 62 may be used to accommodate any desired MEP and HVAC features.

The inner and outer skins may be removable and can be replaced at a later time if the need arises or a change of the finishing is desired. The finishing of the modules can be of various types and can range from average to high quality, and so this system can be used for low cost housing as well as high-quality high-cost housing. The end result is a high-quality building at an affordable cost with thermal and sound insulation and with seismic design and alternative energy modules when required.

All the MEP elements in the MEP-HVAC modules are ready to be connected to the fittings and may be held in place by the pumped-in filler material. The various plumbing fittings may be made ready for instant and easy connection to various fixtures, such as sinks, showers, toilets, and the like. These modules may be of different sizes and fittings and are standardized for various projects, with standard modules created for each set of units. There could be modules with various sizes to help in closing any gaps or to adjust spaces if needed.

It is contemplated that the building panels and modules may be equipped with alternative energy solutions. For example, the panels 10 on the exterior of the building 5 could take the form of PV cells for converting solar energy to electrical energy. Alternatively, the panels 10 may be equipped with features to allow the building 5 to benefit from wind energy. These add-on units would help to make the building 5 more energy self-sufficient.

Building elements (such as the panels 10) may have the Z-key 40 integrally formed into the building element, or they may be attached to brackets 42 with the Z-key 40 (i.e. the universal Z-arch system). Where the Z-key 40 is integrally formed into the building element, the Z-key 40 may extend for only a portion of the end 38. Alternatively, the Z-key 40 may extend for the entirety of the end 38, if, for example, a stronger connection between adjacent panels 10 was required. In another embodiment, a number of Z-keys 40 may be formed on the end 38, such that each of the Z-keys 40 on one panel 10 would fit into corresponding Z-keys 40 on the adjacent panel 10.

One advantage of using the universal Z-arch system is that the brackets 42 can be fitted or inserted into any modular building or construction element to achieve the strength of bond found in a conventional arch.

Figure 16:
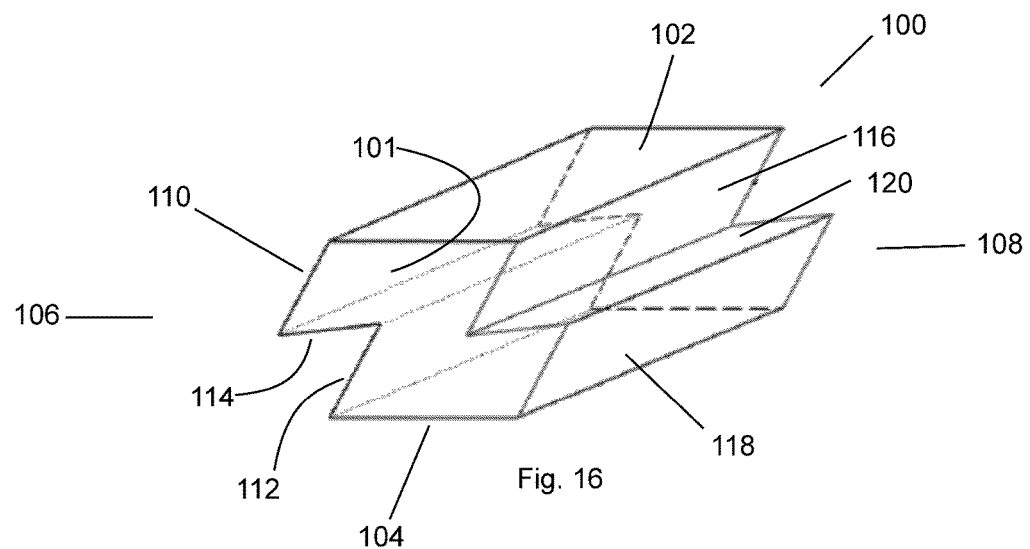
FIG. 16 is a perspective view of a Z-arch in accordance with the invention.
Figure 17:
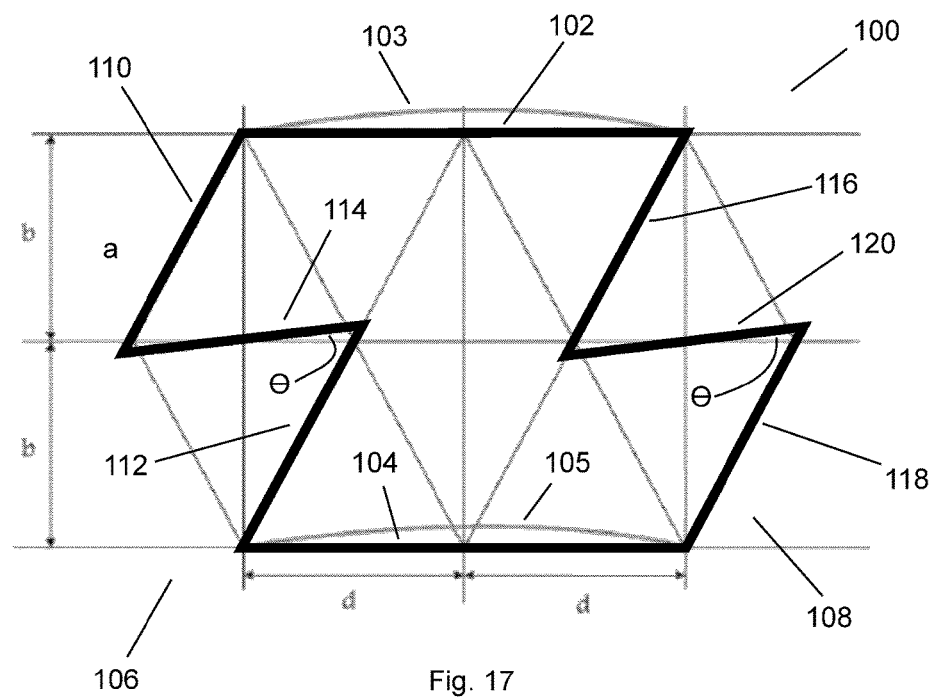
FIG. 17 is a front view of a Z-arch in accordance with the invention.

In another aspect of the invention, one or more elements incorporating the general shape of the Z-key 40 may be connected together. For example, FIG. 16 shows an example of one such element, referred to as a Z-arch 100. FIG. 17 shows a cross-sectional view of another example of the Z-arch 100 (shown in bolded line). Z-arch 100 comprises an upper surface 102, a lower surface 104, and first and second lateral ends 106, 108. The first lateral end 106 comprises a first upper descending surface 110 and a first lower descending surface 112 that is spanned by a first middle surface 114. Similarly, the second lateral end 108 comprises a second upper descending surface 116 and a second lower descending surface 118 that is spanned by a second middle surface 120. In the embodiments shown in FIGS. 16 and 17, the first upper descending surface 110 and the second upper descending surface 116 are substantially parallel to each other, and the first lower descending surface 112 and the second lower descending surface 118 are substantially parallel to each other. In addition, the first upper descending surface 110 and the first lower descending surface 112 may be substantially parallel to each other, and the second upper descending surface 116 may be substantially parallel to the second lower descending surface 118.

Preferably, the first middle surface 114 and the second middle surface 120 are also substantially parallel to each other and are both at an angle θ (e.g. the angle formed between the first middle surface 114 and the horizontal line separating the two portions b in FIG. 17) from the horizontal (preferably within a range of between slightly greater than 0 to 5 degrees from the horizontal). However, this angle θ may be greater or smaller, depending on the application and required use.

The upper and lower surfaces 102, 104 may be flat (as in FIG. 16) or they may have a slight curvature (shown in FIG. 17 with the curved lines 103, 105), depending on the application and required use.

Preferably, the Z-arch 100 is made from a sheet of metal (such as light gauge steel) that is bent to form a cross-sectional shape as shown, for example, in FIG. 17. The interior 101 of the Z-arch 100 is preferably substantially hollow. In addition to metal, other suitable materials for forming the Z-arch 100 include plastic or plastic composites and any other materials that are strong but have some degree of flexibility.

Figure 18:
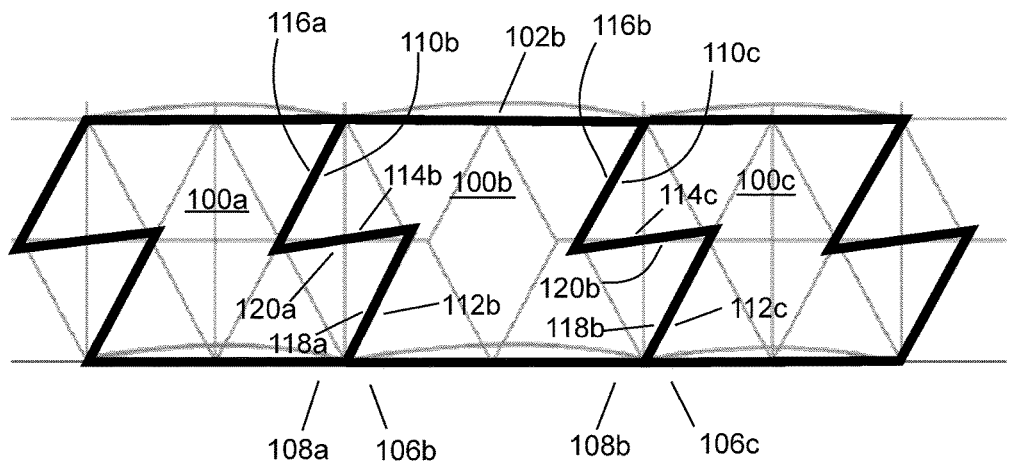
FIG. 18 shows a combination of Z-arches of one embodiment connected together and the general formation of the Z-arch.

Referring to FIG. 18, three Z-arches 100a, 100b, 100c are shown connected together. In the embodiment shown in FIG. 18, the second upper descending surface 116a is in contact with the first upper descending surface 110b, the second middle surface 120a is in contact with the first middle surface 114b, and the second lower descending surface 118a is in contact with the first lower descending surface 112b. Similarly, the second upper descending surface 116b is in contact with the first upper descending surface 110c, the second middle surface 120b is in contact with the first middle surface 114c, and the second lower descending surface 118*b* is in contact with the first lower descending surface 112*c*. As a result of this, the Z-arches 100*a*, 100*b*, 100*c* are interconnected together. Preferably, the respective angles θ of the adjacent Z-arches correspond and match to provide a good fit between adjacent surfaces.

The shape and interlocking of the Z-arches 100*a*, 100*b*, 100*c* provide rigidity and strength to the entire structure. For example, if a force is applied onto the upper surface 102*b* of the Z-arch 100*b*, this force will tend to cause the upper surface 102*b* to be pushed down, which in turn will cause the first and second upper descending surfaces 110*b*, 116*b* to push outwards. This could be more pronounced when the upper surface 102*b* is slightly cambered which could be done when using materials capable of this or if the gauge of the steel allows for it (as shown by the curvatures in FIGS. 17 to 19). This curvature may be used in certain cases when required and possible. The outward force exerted by the first and second upper descending surfaces 110*b*, 116*b* will cause those surfaces to push onto the adjacent second upper descending surfaces 116*a* and first upper descending surfaces 110*c*. This exertion of force will cause the first lateral end 106*b* to lock even further with second lateral end 108*a* and second lateral end 108*b* to lock even further with first lateral end 106*c*. In this manner, the downward force exerted on Z-arch 100*b* is transferred laterally to the adjacent Z-arches 100*a*, 100*c*, which can be further transferred laterally to other adjacent Z-arches 100. The Z-arches 100*a*, 100*b*, 100*c* therefore act in a similar manner as elements in a conventional arch (i.e. vertical forces are transferred laterally). This allows the Z-arches 100*a*, 100*b*, 100*c* to support greater loads. This lateral transfer of force is best realized when the Z-arch 100 is substantially hollow and when the material forming the Z-arch 100 has some degree of flexibility.

The rigidity and strength provided by interlocking Z-arches 100 is generally best when the angle θ is approximately 5 degrees (for the relative dimensions of the Z-arches 100 shown in the figures). However, other angles are also possible, depending on the application and/or on the length of the upper and lower surfaces 102, 104. When the angle θ is exactly 0 degrees (i.e. the first and/or second middle surfaces 114, 120 are flat), this forms merely the "flat connection" described above and does not provide the lateral transfer of force shown by the Z-arch 100.

Referring back to FIG. 17, the height of the Z-arch 100 can be generally defined as being 2×b, with the width being generally defined as 2×d. Preferably, the value of b is substantially the same as the value of d. However, it is also conceivable that the values of b and d are different. The relative angles of the first upper descending surface 110, the first lower descending surface 112, the second upper descending surface 116, and the second lower descending surface 118 with respect to the horizontal will depend, at least in part, on the angles θ. Preferably, these angles (for first upper descending surface 110, first lower descending surface 112, second upper descending surface 116, and second lower descending surface 118) on adjacent Z-arches correspond and match to provide a good fit between adjacent surfaces.

Figure 19:
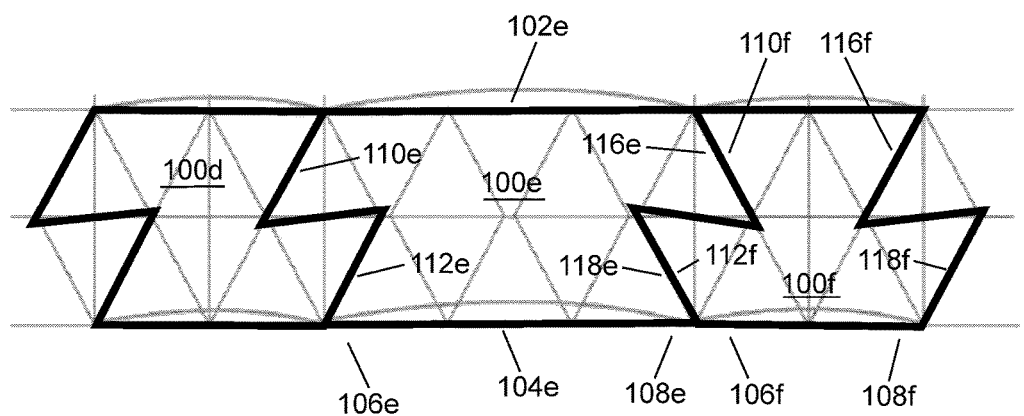
FIG. 19 shows another embodiment of a combination of Z-arches of different embodiments and the general formation of the Z-arch.

FIG. 19 shows another embodiment of three Z-arches 100*d*, 100*e*, 100*f* connected together. In this embodiment, Z-arch 100*d* is similar in shape to the embodiment shown in FIG. 16. However, both Z-arches 100*e* and 100*f* are shaped somewhat differently. In Z-arch 100*f*, the first and second lateral ends 106*f*, 108*f* are substantially mirror images of each other. In other words, instead of the first upper descending surface 110*f* being substantially parallel to second upper descending surface 116*f*, they are angled towards each other. Similarly, the first lower descending surface 112*f* and the second lower descending surface 118*f* are angled towards each other.

The lateral ends 106*e*, 108*e* of Z-arch 100*e* are also substantially mirror images of each other. However, in Z-arch 100*e*, the first upper descending surface 110*e* and the second upper descending surface 116*e* are angled away from each other, and the first lower descending surface 112*e* and the second lower descending surface 118*e* are also angled towards each other. In addition, the upper and lower surfaces 102*e*, 104*e* are substantially longer than in the embodiment shown in FIG. 16. However, the interaction and interconnection of the Z-arches 100*d*, 100*e*, 100*f* work in a similar manner.

Figure 20:
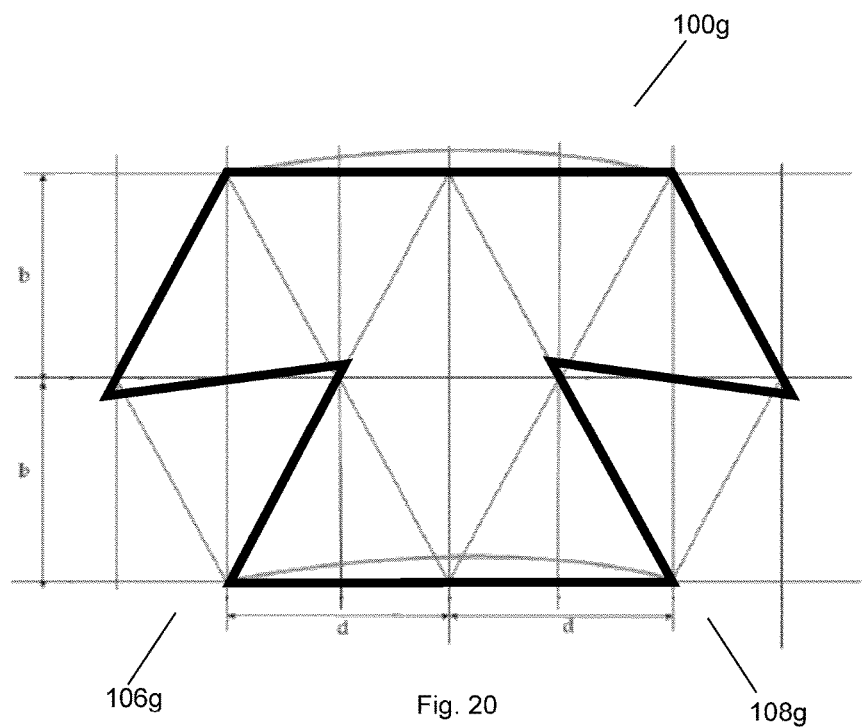
FIG. 20 shows another embodiment of the Z-arch and the general formation of the Z-arch as well as the general indication of the angles.

FIG. 20 shows an embodiment of Z-arch 100*g*. In this embodiment, the lateral ends 106*g*, 108*g* are again substantially mirror images of each other.

Figure 21:
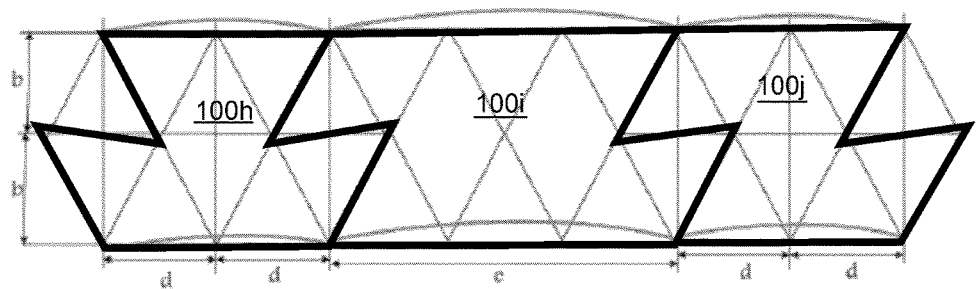
FIG. 21 shows another embodiment of a combination of Z-arches of different embodiments and the general formation of the Z-arch.

FIG. 21 shows Z-arches 100*h*, 100*i*, 100*j* connected together. In this embodiment, Z-arch 100*i* is somewhat longer (shown as e) than Z-arches 100*h*, 100*j*. In addition, the orientations of the first and second descending surfaces 110, 112, 116, 118 vary. However, as long as the lateral ends 106, 108 of adjacent Z-arches 100 are able to interconnect, the structure as a whole will be able to function as an arch.

Figure 22:
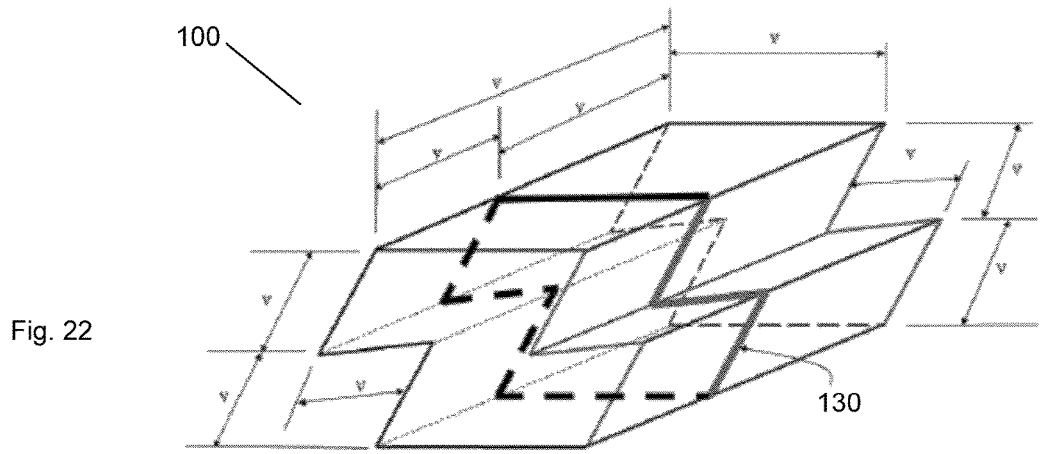
FIG. 22 is a perspective view of a Z-arch showing a stiffening insert.

FIG. 22 is a perspective view of an embodiment of the Z-arch 100. The dimensions shown as v in FIG. 22 may be varied depending on the requirements of the structure. As seen in FIG. 22, the interior of the Z-arch 100 is preferably hollow. Alternatively, one or more stiffening inserts 130 may be inserted into the Z-arch 100 to provide further rigidity.

Figure 23:
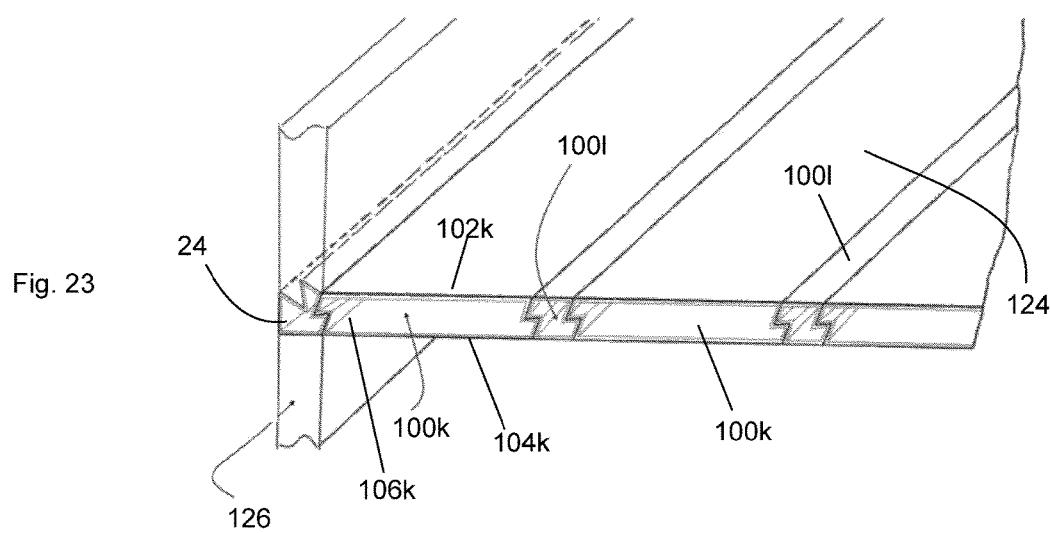
FIG. 23 is a perspective sectional view showing Z-arches used for forming a flat structure.
Figure 24:
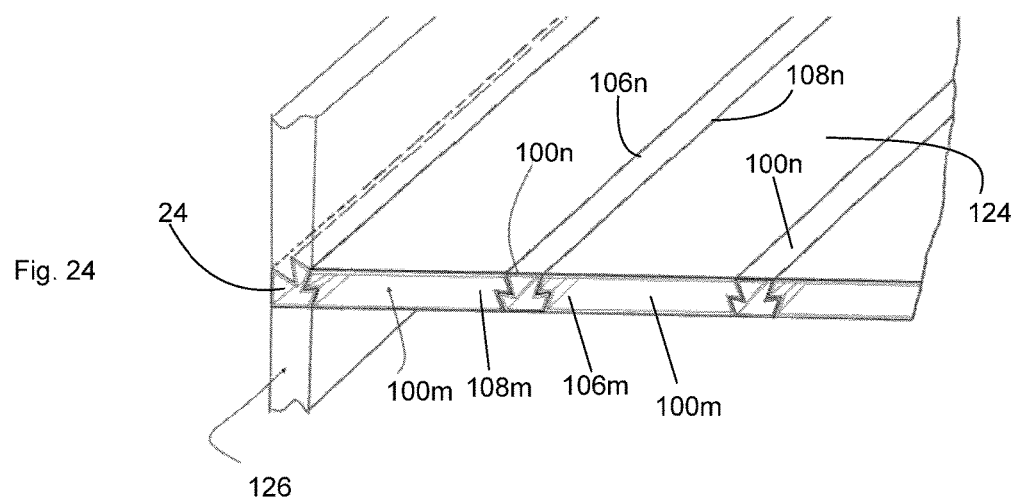
FIG. 24 is a perspective view showing a floor constructed using a multiplicity of interconnecting Z-arches according to the invention.

Referring to FIGS. 23 and 24, a number of Z-arches 100 may be used to provide a substantially flat structure 124. The flat structure 124 may be used as a floor or a ceiling. In the example shown in FIG. 24, the flat structure 124 is formed predominantly from two types of Z-arches (100*k*, 100*l*). Z-arches 100*k* have relatively longer upper and lower surfaces 102*k*, 104*k*, whereas Z-arches 100*l* are similar in dimension to the Z-arch 100 shown in FIG. 16. In FIG. 24, Z-arches 100*k* alternate with Z-arches 100*l*, although this is not necessary. At the ends of the flat structure 124, the first lateral end 106*k* may be connected to a wall 126 using a connector (such as three-way connector 24).

FIG. 24 shows another embodiment in which the flat structure 124 is formed from two other types of Z-arches (100*m*, 100*n*). In this embodiment, the Z-arches 100*m* alternate with Z-arches 100*n*. Z-arches 100*m* have relatively longer upper and lower surfaces 102*m*, 104*m*; however, the orientation of the lateral ends 106*m*, 106*n*, 108*m*, 108*n* are different from those in FIG. 24. For example, Z-arches 100*n* have lateral ends 106*n*, 108*n* that are substantially mirror images of each other.

Figure 25:
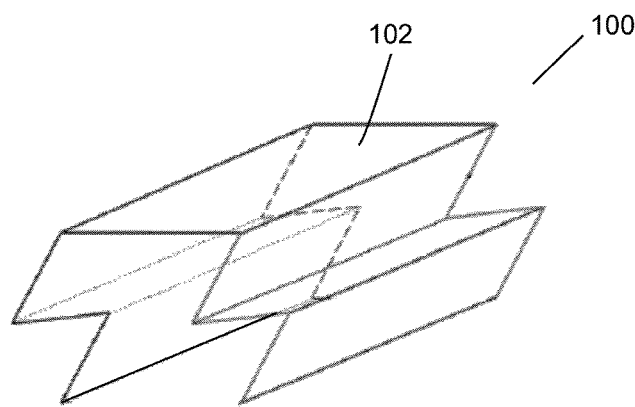
FIG. 25 is a perspective view showing a floor constructed using an alternative embodiment of interconnecting Z-arches according to the invention.

In another embodiment, the lower surface 104 of the Z-arch 100 does not need to be a closed surface. In other words, the lower surface 104 may be partially or completely open, but the lower portion of the Z-arch should preferably be buttressed or connected at intervals by slats or bars to ensure that the lateral ends 106, 108 remain in substantially parallel planes (as shown in FIG. 25).

Figure 26:
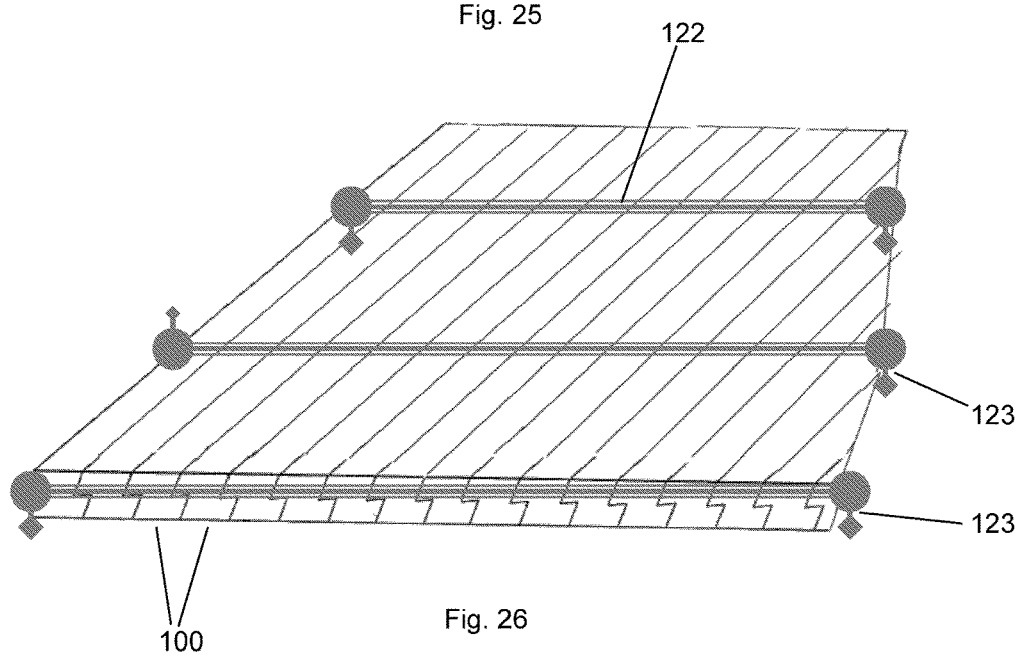
FIG. 26 is a perspective view showing Z-arches used for forming a flat structure.
Figure 27:
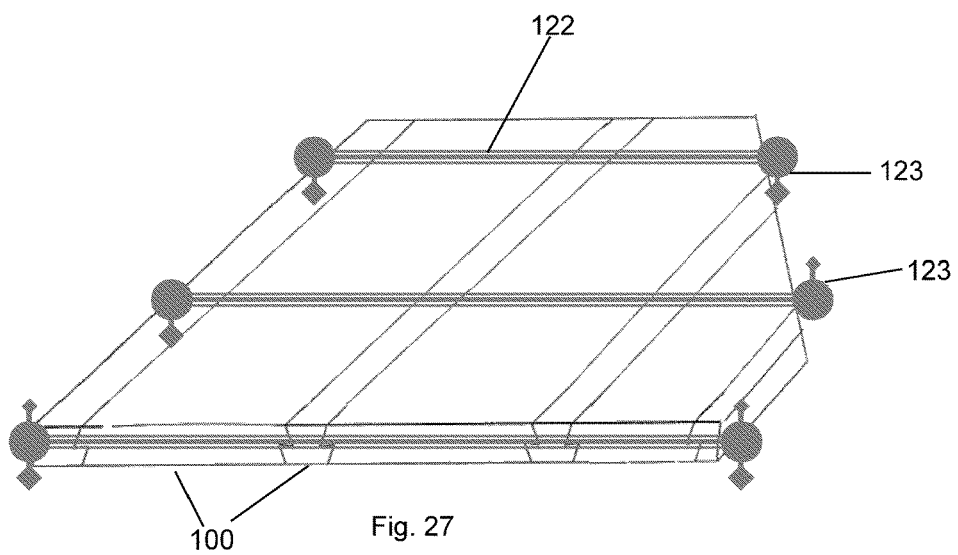
FIG. 27 is another perspective view showing Z-arches used for forming a flat structure.

FIGS. 26 and 27 show the use of one or more cables 122 to hold interconnected Z-arches 100 together. The cables 122 may be heavy steel wires or the like and are generally used when the structure of multiple Z-arches 100 is not supported on a wall or by any other support on the ends. For example, this would be the case when the Z-arches 100 are used to form a bridge or suspended roof. Typically, cables 122 may not be required as the walls on the ends would buttress the Z-arches 100 together. The cables 122 preferably run along the bottom surfaces 104 through the middle of the interconnected Z-arches 100. In the examples shown in FIGS. 26 and 27, the ends of the cables 122 may be attached to one of the Z-arches 100 using fasteners 123 to ensure that the Z-arches 100 are fit tightly against each other.

Figure 28:
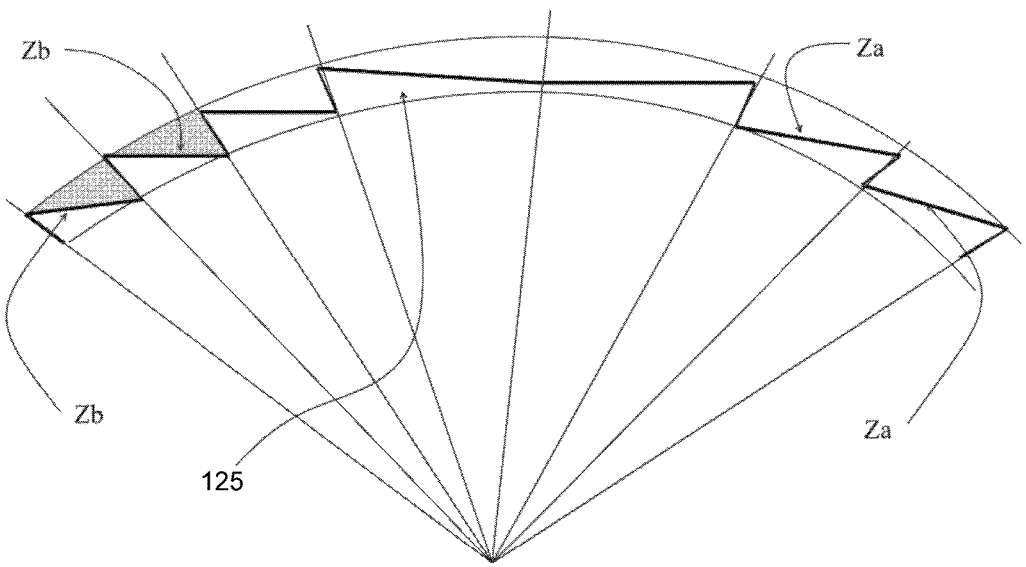
FIG. 28 shows the inception of the Z-arch and how the conventional arch is flattened into the Z-arch and how the Z-arch redirects the forces of tension and compression into various planes.
Figure 29:
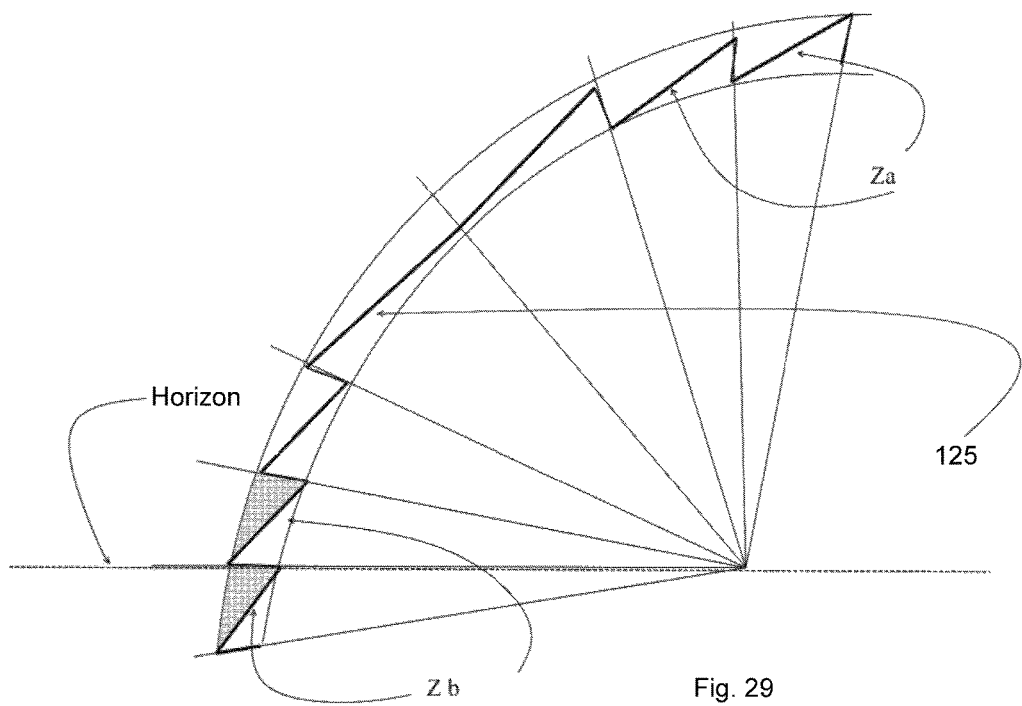
FIG. 29 shows another diagrammatic description of FIG. 28 rotated to a horizontal level.

In another embodiment, the upper surface 102 may be perforated or shaped as in a honeycomb fashion (to give one example), depending on the application Referring to FIGS. 28 and 29, a conventional arch is shown in segments 125. In FIG. 28, the segments 125 show the direction of the forces in a conventional arch and how they (Za, Zb) are divided and directed into the Z-arch 100. The forces are transferred laterally to the sides along the curvature of the conventional arch. In FIG. 29, a portion of a conventional arch is shown. Again, the forces represented by Za and Zb are transferred laterally to the side (i.e. the end of the arch). The segments of the conventional arch clearly show how the Z-arch 100 appears to be present within the conventional arch. In particular, the acute "Z-shape" present in the Z-arch 100 is shown as part of the segments 125.

Referring to FIGS. 28 and 29, a conventional arch is shown in segments 125. In FIG. 29, the segments 125 show the direction of the forces in a conventional arch and how they (Za, Zb) are divided and directed into the Z-arch 100. The forces are transferred laterally to the sides along the curvature of the conventional arch. In FIG. 30, a portion of a conventional arch is shown. Again, the forces represented by Za and Zb are transferred laterally to the side (i.e. the end of the arch). The segments of the conventional arch clearly show how the Z-arch 100 appears to be present within the conventional arch. In particular, the acute "Z-shape" present in the Z-arch 100 is shown as part of the segments 125.

This "Z-shape" (also seen as part of the Z-key 40) forms the basis for the Z-arch 100 of the present invention. For example, the orientation of the first upper descending surface 110, the first middle surface 114, and the first lower descending surface 112 provides this "Z-shape" and forms the basis for the Z-arch 100. Their orientation and how they interact with the corresponding second lower descending surface 118, second middle surface 120, and second upper descending surface 116 (respectively) provides the rigidity and strength of the Z-arch 100.

While the building system was described above in relation to the formation of a building, it is contemplated that the same interlocking building system modules could be used to build any manner of structure. For example, they could be used to build a canal or river or water reservoirs by interlocking floor and side walls to form a trench and then adding a waterproofing barrier. By also adding a roof, a tunnel or reservoir can be formed which could be used above or below ground.

The system is ideal to build rainstorm channels in an emergency or to build diversion channels/rivers, as it is a lightweight and interlocking system that can be assembled quickly and with precision.

The system is designed to resist seismic shock and so can be used to build structures to that effect, where the interlocking elements could absorb the shock and reduce the impact of the shock from the other parts of the module so that the walls do not crack, especially since each interlocking Z-arch 100 can vibrate independently or/and have a tolerance for movement. This is due to the fact that the Z-arches 100 do not need to be glued or fixed rigidly to each other, but while still remaining firmly connected together, thus avoiding breaking. This would help in keeping the overall structure safe and intact.

The light weight of the system makes it possible to transport the modules quickly without the need for very heavy equipment which is a great advantage giving it the element of speed of transportation and installation coupled with the element of precision. The ease of transportability without the need for extra heavy equipment is also a major advantage when the projects are in distant locations and heavy equipment is not easily or readily available.

The use of the interlocking Z-arches 100 and the universal Z-arch system makes it easy to disengage and demount and/or dismantle the built structures and relocate without having to break the elements/modules/structures. Thus the system is demountable, dismountable, and relocatable.

The Z-arch 100 of the present invention may be used in reconstruction, such as after a natural disaster or war, where it is possible to insert or connect the panels of this system to almost all other types of buildings constructed with the various other building materials/systems and designs using the universal Z arch connector 42, where one part of the connector can be inserted and/or connected to the existing building and the other part to the panel of the Z-arch building system. This is generally not possible or quite difficult to do with other building systems, where for example inserting a panel of light gauge steel into a brick wall would have difficulty of connection due to the two different types of materials and designs. Because of the relatively light weight of the Z-arches 100, they can be easily and quickly transported and used to construct entire buildings (including walls, floors, and ceilings). Even though the Z-arches 100 are of relatively light weight, the resulting buildings and structures will be of relatively high strength and rigidity.

It will be appreciated by those skilled in the art that the preferred embodiment has been described in some detail but that certain modifications may be practiced without departing from the principles of the invention.

What is claimed is:

1. An arch system for supporting a load, the arch system comprising:
a module of a plurality of hollow interconnecting modules arranged in an end-to-end manner to form a flattened arch, said module configured to be interconnected with at least one other adjacent module of said plurality of modules, said module comprising:
an upper and a lower longitudinal surface; and
at least one shaped end, a first one of said at least one shaped end comprising:
a first and a second wall segment, wherein a first end of the first wall segment is connected to an end of the upper surface and extending inwards therefrom and terminating with a second end approximately at a midpoint between said upper and lower surfaces, wherein a first end of the second wall segment is connected to a corresponding end of the lower surface and extending inwards therefrom and terminating with a second end approximately at said midpoint between said upper and lower surfaces, wherein the first and second wall segments are spaced apart from each other and substantially parallel, wherein the first wall segment is at an acute angle to the upper longitudinal surface; and
a first ledge segment coupling said second end of said first wall segment to said second end of said second wall segment;
a second one of said at least one shaped end comprising:

a first and a second wall segment, wherein a first end of the first wall segment is connected to an end of the lower surface and extending inwards therefrom and terminating with a second end approximately at a midpoint between said upper and lower surfaces, wherein a first end of the second wall segment is connected to a corresponding end of the upper surface and extending inwards therefrom and terminating with a second end approximately at said midpoint between said upper and lower surfaces, wherein the first and second wall segments are spaced apart from each other and substantially parallel, wherein the first wall segment is at an acute angle to the lower longitudinal surface; and a second ledge segment coupling said second end of said first wall segment to said second end of said second wall segment, wherein each of the at least one shaped end is configured such that the first wall segment of a first module engages the second wall segment of an adjacent second module, the second wall segment of the first module engages the first wall segment of the second module, and the first ledge segment of the first module engages the second ledge segment of the second module.

2. The arch system of claim 1, wherein the ledge segment is substantially horizontal.

3. The arch system of claim 1, wherein the ledge segment is angled with respect to a horizontal axis.

4. The arch system of claim 1, wherein each of the modules comprises two shaped ends.

5. The arch system of claim 4, wherein the first and second shaped ends are on opposing ends of each of the modules.

6. The arch system of claim 1, wherein the upper and lower surfaces are substantially parallel to each other.

7. The arch system of claim 1, wherein the plurality of hollow interconnecting modules comprises three or more modules.

8. The arch system of claim 3, wherein the second end of said first wall segment and the second end of said second wall segment extend beyond said midpoint such that the ledge segment is angled approximately 5 degrees from the horizontal axis.

9. The arch system of claim 1, wherein the first and second wall segments extend for substantially an entire side of the module.

10. The arch system of claim 1, wherein the modules are formed from a single sheet of material.

11. The arch system of claim 10, wherein the material is one of the following: steel or plastic composite.

12. The arch system of claim 10, wherein the modules are formed by bending the single sheet of material.

13. A method for forming an arch system for supporting a load, the method comprising:
providing a plurality of hollow interconnecting modules, wherein one or more of the modules comprises:
an upper and a lower longitudinal surface;
a first shaped end comprising:
a first and a second wall segment, wherein a first end of the first wall segment is connected to an end of the upper surface and extending inwards therefrom and terminating with a second end approximately at a midpoint between said upper and lower surfaces, wherein a first end of the second wall segment is connected to a corresponding end of the lower surface and extending inwards therefrom and terminating with a second end approximately at said midpoint between said upper and lower surfaces, wherein the first and second wall segments are spaced apart from each other and substantially parallel, wherein the first wall segment is at an acute angle to the upper longitudinal surface; and a first ledge segment coupling said second end of said first wall segment to said second end of said second wall segment;

a second shaped end comprising:
a first and a second wall segment, wherein a first end of the first wall segment is connected to an end of the lower surface and extending inwards therefrom and terminating with a second end approximately at a midpoint between said upper and lower surfaces, wherein a first end of the second wall segment is connected to a corresponding end of the upper surface and extending inwards therefrom and terminating with a second end approximately at said midpoint between said upper and lower surfaces, wherein the first and second wall segments are spaced apart from each other and substantially parallel, wherein the first wall segment is at an acute angle to the lower longitudinal surface; and a second ledge segment coupling said second end of said first wall segment to said second end of said second wall segment;

arranging the plurality of modules in an end-to-end manner to form a flattened arch; and
interconnecting each of the plurality of modules with at least one other adjacent module, wherein the first wall segment of a first module engages the second wall segment of an adjacent second module, the second wall segment of the first module engages the first wall segment of the second module, and the first ledge segment of the first module engages the second ledge segment of the second module.

14. The method of claim 13, wherein the ledge segment is substantially horizontal.

15. The method of claim 13, wherein the ledge segment is angled with respect to a horizontal axis.

16. The method of claim 13, wherein each of the modules comprises two shaped ends.

17. The method of claim 16, wherein the first and second shaped ends are on opposing ends of each of the modules.

18. The method of claim 13, wherein the upper and lower surfaces are substantially parallel to each other.

19. The method of claim 13, wherein the second end of said first wall segment and the second end of said second wall segment extend beyond said midpoint such that the ledge segment is angled approximately 5 degrees from the horizontal axis.

20. The method of claim 13, further comprising the steps of:
disassembling the interconnected modules into two or more portions;
transporting the two or more portions from a first location to a second location; and
recombining the two or more portions at the second location.

21. The method of claim 13, further comprising the step of installing one or more utilities within the modules.

22. The method of claim 21, wherein the one or more utilities comprise one or more of the following: electrical, mechanical, plumbing, heating, ventilation, and air conditioning.

23. A method for forming a structure for transporting or holding water, the method comprising:
- providing a plurality of hollow interconnecting modules, wherein one or more of the plurality of modules comprises:
- upper and lower longitudinal surfaces;
- a first shaped end comprising:
    - a first and a second wall segment, wherein a first end of the first wall segment is connected to an end of the upper surface and extending inwards therefrom and terminating with a second end approximately at a midpoint between said upper and lower surfaces, wherein a first end of the second wall segment is connected to a corresponding end of the lower surface and extending inwards therefrom and terminating with a second end approximately at said midpoint between said upper and lower surfaces, wherein the first and second wall segments are spaced apart from each other and substantially parallel, wherein the first wall segment is at an acute angle to the upper longitudinal surface; and
    - a first ledge segment coupling said second end of said first wall segment to said second end of said second wall segment;
- a second shaped end comprising:
    - a first and a second wall segment, wherein a first end of the first wall segment is connected to an end of the lower surface and extending inwards therefrom and terminating with a second end approximately at a midpoint between said upper and lower surfaces, wherein a first end of the second wall segment is connected to a corresponding end of the upper surface and extending inwards therefrom and terminating with a second end approximately at said midpoint between said upper and lower surfaces, wherein the first and second wall segments are spaced apart from each other and substantially parallel, wherein the first wall segment is at an acute angle to the lower longitudinal surface; and
    - a second ledge segment coupling said second end of said first wall segment to said second end of said second wall segment;
- arranging the modules in an end-to-end manner to form a flattened arch;
- interconnecting each of the modules with at least one other adjacent module to form a water holding structure, wherein the first wall segment of a first module engages the second wall segment of an adjacent second module, the second wall segment of the first module engages the first wall segment of the second module, and the first ledge segment of the first module engages the second ledge segment of the second module,
- wherein the structure is one of the following: reservoir, tunnel, and canal.

* * * * *